(No Model.) 2 Sheets—Sheet 1.

G. ROBINSON.
HARNESS.

No. 265,148. Patented Sept. 26, 1882.

Attest.
Chas. F. Spencer
H. E. Shaffer

Inventor.
Geo Robinson,
Jr R. F. Osgord,
Atty.

(No Model.) 2 Sheets—Sheet 2.

G. ROBINSON.
HARNESS.

No. 265,148. Patented Sept. 26, 1882.

Attest.
Chas. F. Spencer
H. E. Shaffer

Inventor.
Geo. Robinson
Mr R. F. Osgood,
atty.

UNITED STATES PATENT OFFICE.

GEORGE ROBINSON, OF SODUS, NEW YORK.

HARNESS.

SPECIFICATION forming part of Letters Patent No. 265,148, dated September 26, 1882.

Application filed July 19, 1882. (No model.)

*To all whom it may concern:*

Be it known that I, GEORGE ROBINSON, of Sodus, (Wallington P. O.,) Wayne county, New York, have invented a certain new and useful Improvement in Harness; and I do hereby declare that the following is a full, clear, and exact description of the same, reference being had to the accompanying drawings, in which—

Figure 1:
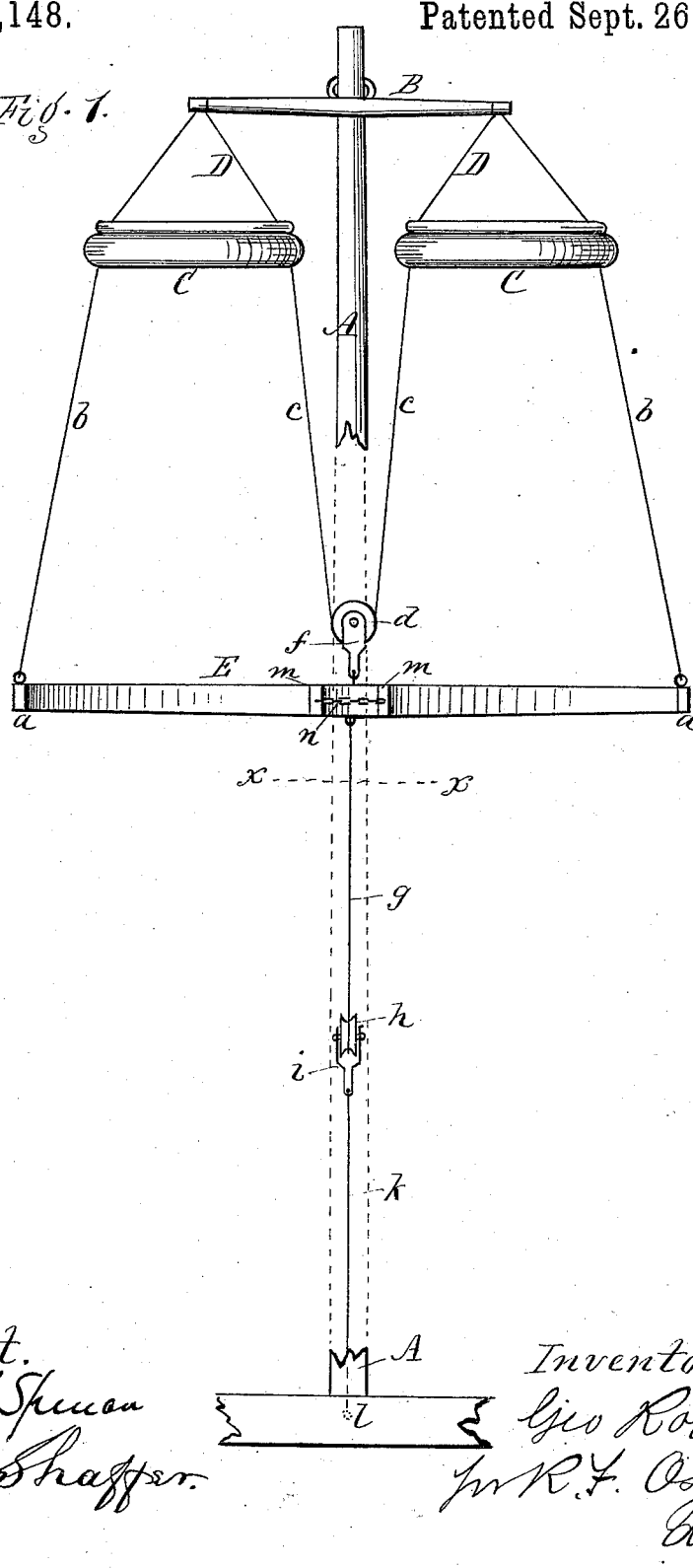
Figure 2:
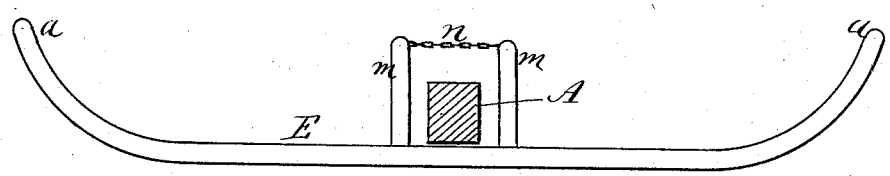
Figure 3:
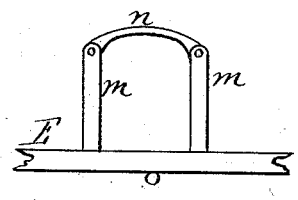
Figure 4:
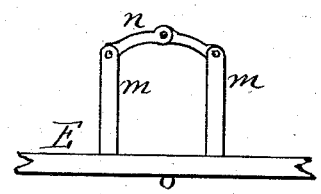
Figure 5:
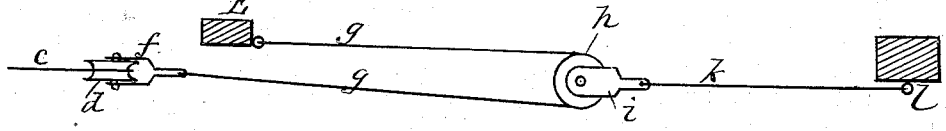

Figure 1 is a plan of my improvement. Fig. 2 is a cross-section in line $x$ $x$ of Fig. 1, showing the draw-bar or evener on an enlarged scale. Figs. 3 and 4 are modifications of Fig. 2. Fig. 5 is a side elevation of the draft arrangement.

My improvement relates to draft attachments for farming and other heavy uses, and is of that kind where a draw-bar or evener rests under the horses' bellies, and where a system of tugs or traces is connected therewith, whereby the draft is equalized.

The object of my invention is to adapt this kind of harness to use with a tongue or pole; and it consists in the following construction and arrangement of parts.

In the drawings, A indicates an ordinary pole or tongue, connected with the load in the rear, and passing through the ring of a neck-yoke, B, in front, in the usual way.

C C are the collars, which rest on the horses' necks, and D D are the holdback-straps, all arranged in the usual manner.

E is the draw-bar or evener, which is of sufficient length to extend under the bellies of both horses and project on opposite sides, the outer ends being turned up, as shown at $a$ $a$.

$b$ $b$ are two traces, one on the outside of each horse, which connect the hames with the outer ends of the draw-bar.

$c$ $c$ are two inner traces in a single length, attached at the ends to the inner sides of the hames, and passing around a pulley, $d$, which is attached to a clevis or frame, $f$, by which it is held.

$g$ is a draft cord or chain, attached at one end to the stirrup $f$ and at the other to the rear side of the evener, extending thence backward around a pulley, $h$, resting in a stirrup, $i$. To the stirrup $i$ is attached a draft cord or chain, $k$, extending backward and attached at $l$ to the load to be drawn.

The above-described draft attachment is now in use, and I disclaim any invention in the same; but as heretofore used it has only been in connection with plows and other devices where the attachment is flexible, and where no tongue or pole is used. No means have heretofore been known whereby such an attachment could be used in connection with wagons or other devices having tongues; and my invention consists in adapting it to use on tongues by the following means:

$m$ $m$ are two vertical standards or arms near the center of the draw-bar or evener E, and which rest between the two horses. These standards are at such distance apart as to allow the tongue A to pass freely between them, as shown in Fig. 2, and of such a height as to come above the tongue. The tops of the standards are connected by a chain, $n$, as shown in Fig. 2, a pivoted bow, as shown in Fig. 3, two pivoted half-bows, as shown in Fig. 4, or by some other means which will inclose and secure the tongue and prevent its escape from between the standards. By the means above described the evener is kept centered on the tongue, and cannot "shuck" or slide endwise, and consequently the horses cannot be crowded or pushed in either direction, but the draft will be as uniform and regular as in the ordinary harness designed specially for wagons. The tongue will also be supported to a certain extent in the center, thus relieving the weight on the neck-yoke. The standards are at such a distance apart that the evener can have the necessary play without cramping upon the tongue.

Having thus described my invention, I claim—

In a draft-harness attachment of the character described, the combination, with the evener adapted to pass beneath the bodies of the horses, of the standards $m$ $m$, whereby the pole or tongue may be used in connection with the evener, all substantially as set forth.

In witness whereof I have hereunto signed my name in the presence of two subscribing witnesses.

GEORGE ROBINSON.

Witnesses:
 F. S. PARSONS,
 CARL GAYLORD.